United States Patent
Ho et al.

(10) Patent No.: US 11,884,404 B2
(45) Date of Patent: Jan. 30, 2024

(54) ENVIRONMENTAL CONTROL SYSTEM TRIM AIR HEAT EXCHANGER

(71) Applicant: Hamilton Sundstrand Corporation, Charlotte, NC (US)

(72) Inventors: Tony Ho, Glastonbury, CT (US); Louis J. Bruno, Ellington, CT (US); Aiden Coutin, Ogden, UT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 65 days.

(21) Appl. No.: 17/470,688

(22) Filed: Sep. 9, 2021

(65) Prior Publication Data
US 2023/0074116 A1    Mar. 9, 2023

(51) Int. Cl.
*B64D 13/06*  (2006.01)
*B60H 1/32*  (2006.01)
*F02C 6/08*  (2006.01)

(52) U.S. Cl.
CPC ........... *B64D 13/06* (2013.01); *B60H 1/3211* (2013.01); *F02C 6/08* (2013.01); *B64D 2013/0618* (2013.01); *F05D 2220/32* (2013.01)

(58) Field of Classification Search
CPC ........... B64D 13/06; B64D 2013/0618; B64D 2013/0655; B64D 13/08; B64D 2013/0688; B60H 1/3211
See application file for complete search history.

(56) References Cited

U.S. PATENT DOCUMENTS

| | | | |
|---|---|---|---|
| 6,012,515 A | 1/2000 | Stubbendorff et al. | |
| 9,783,309 B2 | 10/2017 | Vue et al. | |
| 10,457,399 B2 | 10/2019 | Bammann et al. | |
| 2011/0174006 A1* | 7/2011 | Arendt | B64D 13/00 165/203 |
| 2020/0391870 A1 | 12/2020 | Bruno et al. | |

OTHER PUBLICATIONS

European Search Report and Written Opinion for European Application No. 22194623.9; dated Jan. 30, 2023 (9 Pages).

* cited by examiner

*Primary Examiner* — Edelmira Bosques
*Assistant Examiner* — Michael James Giordano
(74) *Attorney, Agent, or Firm* — CANTOR COLBURN LLP

(57) ABSTRACT

An environmental control system includes an environmental control system pack having a trim outlet and a primary outlet. A trim medium is output from the trim outlet and a first medium is output from the primary outlet. An inlet of a mixing manifold is connected to the primary outlet of the at least one environmental control system pack. A trim heat exchanger is connected to the trim outlet and the at least one inlet of the environmental control system pack. Within the trim heat exchanger, the trim medium is arranged in a heat exchange relationship with a second medium. From the trim heat exchanger, the second medium is provided to an inlet of the least one environmental control system pack and the trim medium is mixed with a flow output from an outlet of the mixing manifold.

12 Claims, 3 Drawing Sheets

ENVIRONMENTAL CONTROL SYSTEM TRIM AIR HEAT EXCHANGER

BACKGROUND

Embodiments of the disclosure relate to environmental control systems, and more specifically to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

BRIEF DESCRIPTION

According to one embodiment, an environmental control system includes an environmental control system pack having a trim outlet and a primary outlet. A trim medium is output from the trim outlet and a first medium is output from the primary outlet. An inlet of a mixing manifold is connected to the primary outlet of the at least one environmental control system pack. A trim heat exchanger is connected to the trim outlet and the at least one inlet of the environmental control system pack. Within the trim heat exchanger, the trim medium is arranged in a heat exchange relationship with a second medium. From the trim heat exchanger, the second medium is provided to the at least one inlet of the least one environmental control system pack and the trim medium is mixed with a flow output from an outlet of the mixing manifold.

In addition to one or more of the features described above, or as an alternative, in further embodiments the first medium is outside air and the second medium is bleed air.

In addition to one or more of the features described above, or as an alternative, in further embodiments the at least one environmental control system pack further comprises an air cycle machine having a compressor.

In addition to one or more of the features described above, or as an alternative, in further embodiments the trim outlet is located downstream from the compressor relative to the first medium.

In addition to one or more of the features described above, or as an alternative, in further embodiments the air cycle machine further comprises a turbine and energy is extracted from the second medium within the turbine.

In addition to one or more of the features described above, or as an alternative, in further embodiments the at least one environmental control system pack further comprises a ram air circuit having at least one heat exchanger, the at least one heat exchanger being arranged downstream from the trim heat exchanger and upstream from the turbine relative to a flow of the second medium.

In addition to one or more of the features described above, or as an alternative, in further embodiments the trim medium output from the trim heat exchanger mixed with the flow output from the at least one outlet of the mixing manifold is provided to a load.

In addition to one or more of the features described above, or as an alternative, in further embodiments comprising at least one valve for controlling an amount of the trim medium that is mixed with the flow output from the at least one outlet of the mixing manifold.

In addition to one or more of the features described above, or as an alternative, in further embodiments the second medium is not provided to the load.

In addition to one or more of the features described above, or as an alternative, in further embodiments the at least one environmental control system pack includes a plurality of environmental control system packs, and the primary outlet of each of the plurality of environmental control system packs is fluidly connected to the mixing manifold.

In addition to one or more of the features described above, or as an alternative, in further embodiments the mixing manifold is configured to receive a third medium.

In addition to one or more of the features described above, or as an alternative, in further embodiments the environmental control system is part of an aircraft.

According to an embodiment, a method of conditioning a medium for a load includes conditioning a first flow of a first medium within an environmental control system pack, heating a second flow of the first medium to create a heated second flow of the first medium, and mixing the heated second flow of the first medium with the conditioned first flow of the first medium to meet a cooling demand of the load.

In addition to one or more of the features described above, or as an alternative, in further embodiments the second flow of the first medium is provided from the environmental control system pack.

In addition to one or more of the features described above, or as an alternative, in further embodiments comprising splitting a flow of the first medium within the environmental control system pack into the first flow of the first medium and the second flow of the first medium.

In addition to one or more of the features described above, or as an alternative, in further embodiments the environmental control system pack includes an air cycle machine having a compressor configured to receive the first medium and splitting the flow of the first medium into the first flow of the first medium and the second flow of the first medium occurs downstream from the compressor.

In addition to one or more of the features described above, or as an alternative, in further embodiments heating the second flow of the first medium further comprises arranging the second flow of the first medium in a heat exchange relationship with a second medium via a heat exchanger.

In addition to one or more of the features described above, or as an alternative, in further embodiments the first medium is outside air and the second medium is bleed air.

In addition to one or more of the features described above, or as an alternative, in further embodiments comprising extracting energy from the second medium downstream from the heat exchanger.

In addition to one or more of the features described above, or as an alternative, in further embodiments comprising mixing the conditioned first flow of the first medium with a third medium within a mixing manifold, wherein the mixture of the conditioned first flow of the first medium and the third medium is further mixed with the heated second flow of the first medium to meet the cooling demand of the load.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Embodiments herein provide an environmental control system of an aircraft that receives multiple mediums from different sources and uses energy from one or more of the mediums to operate the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
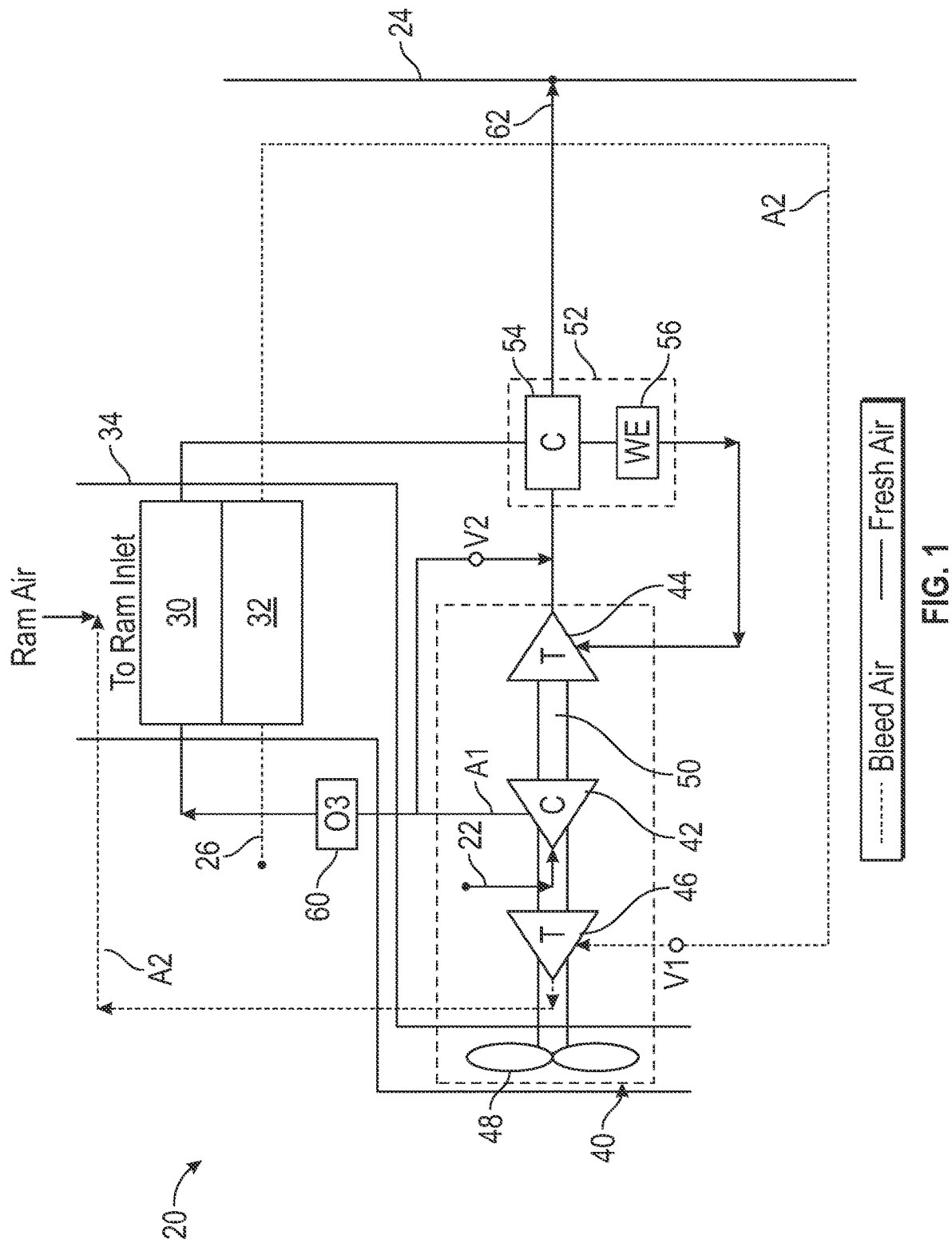
FIG. 1 is a schematic diagram of a pack of an environmental control system according to an embodiment.

With reference now to FIG. 1, a schematic diagram of an environment control system (ECS) pack 20 is depicted according to a non-limiting embodiment. Although the environmental control system pack 20 is described with reference to an aircraft, alternative applications are also within the scope of the disclosure. As shown in FIG. 1, the ECS pack 20 can receive a first medium A1 at a first inlet 22 and provide a conditioned form of only the first medium A1 to a volume 24. In embodiments where the ECS pack 20 is used in an aircraft application, the first medium A1 is fresh or outside ambient air.

The ECS pack 20 is configured to receive a second medium A2 at an inlet 26. In one embodiment, the second medium A2 is bleed air. As used herein, the term "bleed air" includes pressurized air originating from i.e. being "bled" from, an engine or auxiliary power unit of the aircraft. It shall be understood that one or more of the temperature, humidity, and pressure of the bleed air may vary based upon the compressor stage and revolutions per minute of the engine or auxiliary power unit from which the air is drawn. For example, bleed air may be drawn from either a low pressure compressor spool or a high pressure compressor spool of an engine, and bleed air drawn from the low pressure compressor spool will have a relatively lower pressure than bleed air drawn from the high pressure compressor spool. In some embodiments, the ECS pack 20 is configured to extract work from the second medium A2. In this manner, the pressurized air A2 can be utilized by the ECS pack 20 to achieve certain operations.

The ECS pack 20 includes at least one heat exchanger. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers. In an embodiment, the one or more heat exchangers may be located within the shell of a RAM air circuit (not shown), such that the one or more heat exchangers may be referred to as "ram heat exchangers." Within the one or more heat exchangers, a cooling fluid, such as outside air drawn in through a scoop for example, acts as a heat sink to cool a medium passing there through, for example the first medium A1 and/or the second medium A2. In an embodiment, best shown in FIG. 1, the one or more heat exchangers includes a first heat exchanger 30 and a second heat exchanger 32. The heat exchangers 30, 32 may be arranged in series relative to the flow of cooling medium.

The ECS pack 20 additionally comprises at least one compressing device 40. In the illustrated, non-limiting embodiment, the compressing device 40 of the ECS pack 20 is a mechanical device that includes components for performing thermodynamic work on a medium (e.g., extracts work from or applies work to the first medium A1 and/or the second medium A2 by raising and/or lowering pressure and by raising and/or lowering temperature.) Examples of the compressing device 40 include an air cycle machine, a three-wheel air cycle machine, a four-wheel air cycle machine, etc. . . .

As shown, the compressing device 40 includes a compressor 42, a turbine 44, and a power turbine 46, operably coupled to each other via a shaft 50 that is also is connected to a fan 48. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2.

Each of the turbine 44 and the power turbine 46 is a mechanical device that expands a medium and extracts work therefrom (also referred to as extracting energy). In the compressing device 40, the power turbine 46 drives the compressor 42 and the fan 48 via the shaft 50. In an embodiment, a single flow of a medium, such as the second medium A2 for example, is provided to the power turbine 46. However, in other embodiments, not shown, the power turbine 46 can be a dual entry turbine that includes multiple inlet fluid flow paths, such as an inner flow path and an outer flow path, to enable mixing of alternative medium flows within the turbine or at the exit of the power turbine 46. In an embodiment, the inner flow path is a first diameter and the outer flow path is a second diameter. Further, the power turbine 46 may include a first nozzle configured to accelerate the second medium for entry into a turbine impeller and a second nozzle configured to accelerate the another medium for entry into the turbine impeller. The turbine impeller can be configured with a first gas path configured to receive the first medium from the first nozzle and with a second gas path configured to receive the second medium from the second nozzle.

The fan 48 is a mechanical device that can force, via push or pull methods, a medium (e.g., ram air) across the one or more heat exchangers 30 and at a variable cooling to control temperatures.

The ECS pack 20 additionally includes at least one dehumidification system 52. In the illustrated, non-limiting embodiment, the dehumidification system 52 includes a condenser 54 and a water extractor 56. The condenser 54 is a particular type of heat exchanger and the water extractor 56 is a mechanical device that removes water from a medium. The condenser 54 and the water extractor 56 are arranged to receive the first medium A1, and in some embodiments, both the first medium A1 and the second medium A2. The configuration of the at least one dehumidification system 52 may vary. It should be understood that the disclosed configuration of the dehumidification system is intended as an example only, and embodiments including one or more additional components are also within the scope of the disclosure.

The elements of the ECS pack 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve V1 is configured to control a supply of the second medium A2 provided to the ECS pack 20. A second valve V2 may be operable to allow a portion of a medium, such as the first medium A1, to bypass the turbine 44 of the compressing device 40. As a result, operation of the second valve V2 may be used to add heat and to drive the compressing device 40 during failure modes.

The ECS pack 20 of FIG. 1 may be operable in a plurality of modes based on a flight condition of the aircraft. For example, the ECS pack 20 may be operable in a first mode when the ambient temperature is at or above a selected design point of the ECS pack 20. In the first mode of operation, valve V1 is opened to draw a high pressure, hot second medium A2, such as bleed air, from a bleed source, such as the turbine engine or the auxiliary power unit. This second medium A2 is configured to pass through the second heat exchanger 32. Within the second heat exchanger, the high pressure, high temperature second medium A2 is cooled via a heat exchange relationship with the ram air flow. From the second heat exchanger 32, the second medium A2 enters the power turbine 46, such as via a nozzle. The high pressure, high temperature second medium A2 is expanded across the power turbine 46 and work extracted from the hot high pressure air. This extracted work drives the compressor 42 via shaft 50. This extracted work also drives the fan 48, which is used to move air through the heat exchangers 30, 32, via a ram air duct 34. The second medium A2 output from the power turbine 46 may be exhausted overboard, into the ambient atmosphere, or alternatively, may be dumped into the ram air circuit, such as at a location upstream of one or more of the heat exchangers 30, 32.

At the same time, a flow of cool, low pressure first medium A1, such as fresh outside air for example, is provided to an inlet of the compressor 42. The act of compressing the fresh outside air, heats the fresh outside air. The compressed first medium A1 provided at the outlet of the compressor 42 may then pass through an ozone converter 60 before being provided to the heat exchanger 30. Within the heat exchanger 30, the compressed first medium A1 is cooled via a flow of ram air. Embodiments where other components, such as an outflow heat exchanger (not shown) for example, are positioned directly downstream from or upstream from the heat exchanger 30 are also within the scope of the disclosure.

The warm first medium A1 is then provided to at least a portion of the dehumidification system 52. As shown, the first medium A1 output from the heat exchanger 30 is provided sequentially to the condenser 54 and water extractor 56 of the dehumidification system 52 where any free moisture within the first medium A1 is condensed and removed, to produce cool high-pressure air. This cool, high pressure first medium A1 then enters the turbine 44 through an inlet or nozzle.

The cool, high pressure first medium A1 is expanded across the turbine 44 and work is extracted therefrom. In combination with the work resulting from the power turbine 46, this extracted work drives the compressor 42 and the fan 48, as previously described. The cold, for example freezing, first medium A1 output from the turbine 44 enters the condenser 54 to cool the warm first medium A1 leaving the heat exchanger 30. The first medium A1 is then provided to an outlet 62 of the ECS pack 20 for delivery to one or more downstream loads and/or locations of the aircraft.

With continued reference to FIG. 1, the second mode of the ECS pack 20 is associated with operation at ambient temperatures below a selected design point of the environmental control system. In the second mode of operation, the bypass valve V2 is open, thereby allowing at least a portion of the first medium A1 output from the compressor 42 to bypass the heat exchanger 30, the first pass through the condenser 54, the water extractor 56, and the turbine 44. In such embodiments, at least a portion of the first medium A1 output from the compressor 42 is provided downstream from an outlet of the turbine 44, before being provided to the condenser 54 and then delivered to the outlet 62. It should be understood that the ECS pack 20 illustrated and described herein is intended as an example only and that an ECS pack 20 configured to deliver only fresh or outside air or primarily fresh or outside air to the outlet 62 having any suitable configuration is within the scope of the disclosure.

Figure 2:
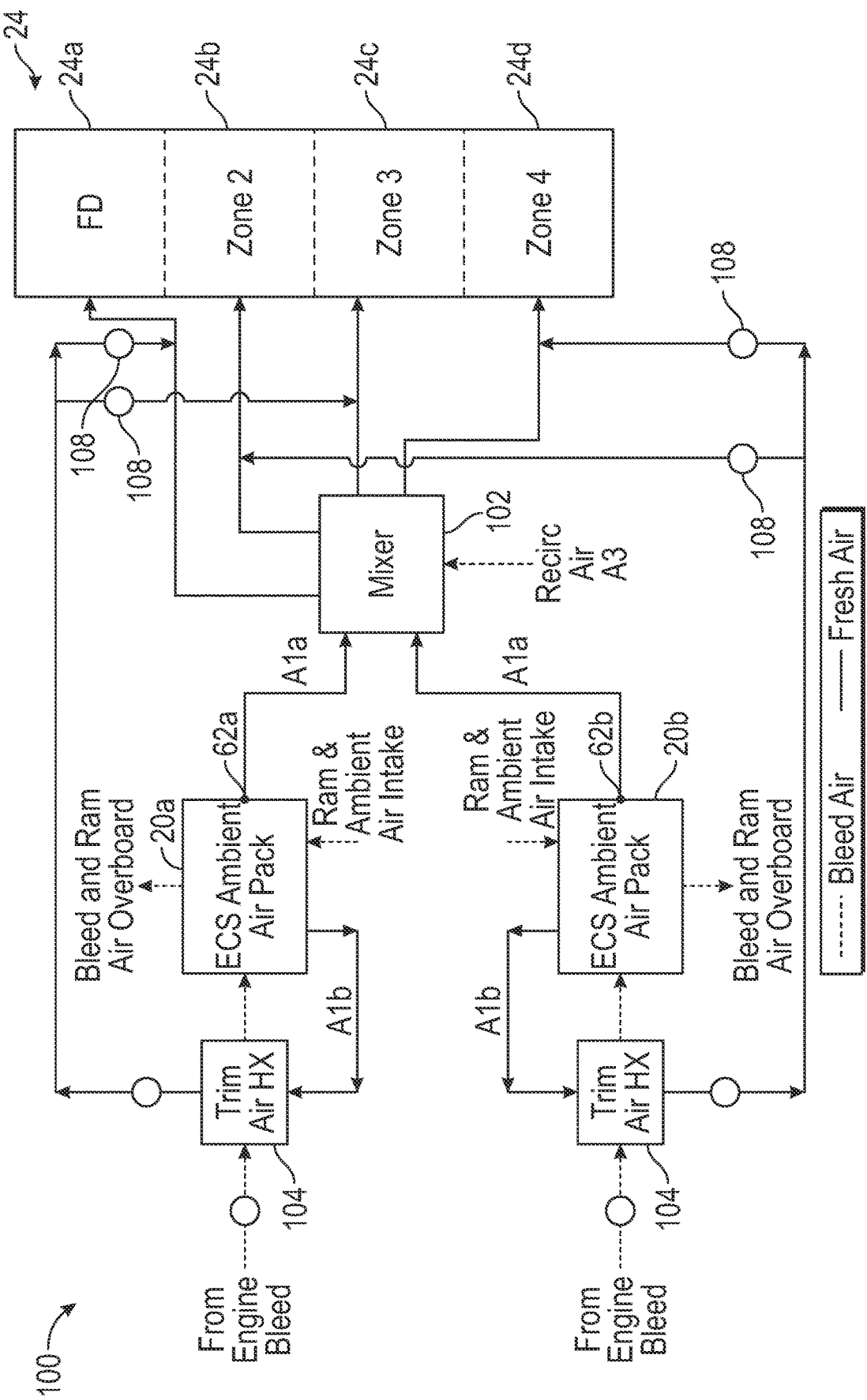
FIG. 2 is a schematic diagram of an environmental control system according to an embodiment.

With reference now to FIG. 2, a schematic diagram of environmental control system 100 including at least one environmental control system pack 20, such as ECS pack 20 for example, is illustrated. Although the system 100 is illustrated as including a first ECS pack 20a and a second substantially identical ECS pack 20b, embodiments of the system 100 having a single ECS pack 20, or having more than two ECS packs 20, such as three or four ECS packs for example, are also contemplated herein. Further, as previously described, the one or more loads of the aircraft includes the cabin or volume 24. As shown in the illustrated, non-limiting embodiment, the volume 24 is divided into a plurality of zones, such as a first zone 24a associated with the flight deck, a second zone 24b associated with the first class portion of the volume 24, a third zone 24c associated with the business class portion of the volume 24, and a fourth zone 24d associated with the economy portion of the volume 24 for example. Each of the plurality of zones 24a-24d may have a separate temperature and therefore cooling demand. Although four distinct zones 24a-24d are illustrated, it should be understood that a system 100 having two, three, or more than four zones is contemplated herein. Further, although the four zones 24a-24d are described herein as different regions of the cabin or volume 24, embodiments where the different zones are different loads arranged at different locations, one or more of which is located remotely from the cabin, e.g., in the cockpit, are also within the scope of the disclosure.

In the illustrated, non-limiting embodiment, the primary outlet 62a, 62b of each of ECS pack 20a, 20b configured to receive a flow of a fully conditioned first medium A1 is fluidly connected with a mixer or mixing manifold 102. Within the mixing manifold 102, the conditioned flows of the first medium (fresh or outside air) A1 from each of the ECS packs 20a, 20b may be mixed with a flow of a third medium A3, such as cabin recirculation air for example. This mixture of conditioned fresh air A1 and recirculated air A3 may then be delivered to one or more loads of the aircraft, such as to condition the one or more zones 24a-24d of the volume 24. In an embodiment, the amount of cooling performed by the ECS packs 20a and 20b when conditioning the fresh air A1 prior to mixing with cabin recirculation air A3 in the mixing manifold 102 is controlled to meet the temperature demands of the hottest zone of the plurality of zones.

Figure 3:
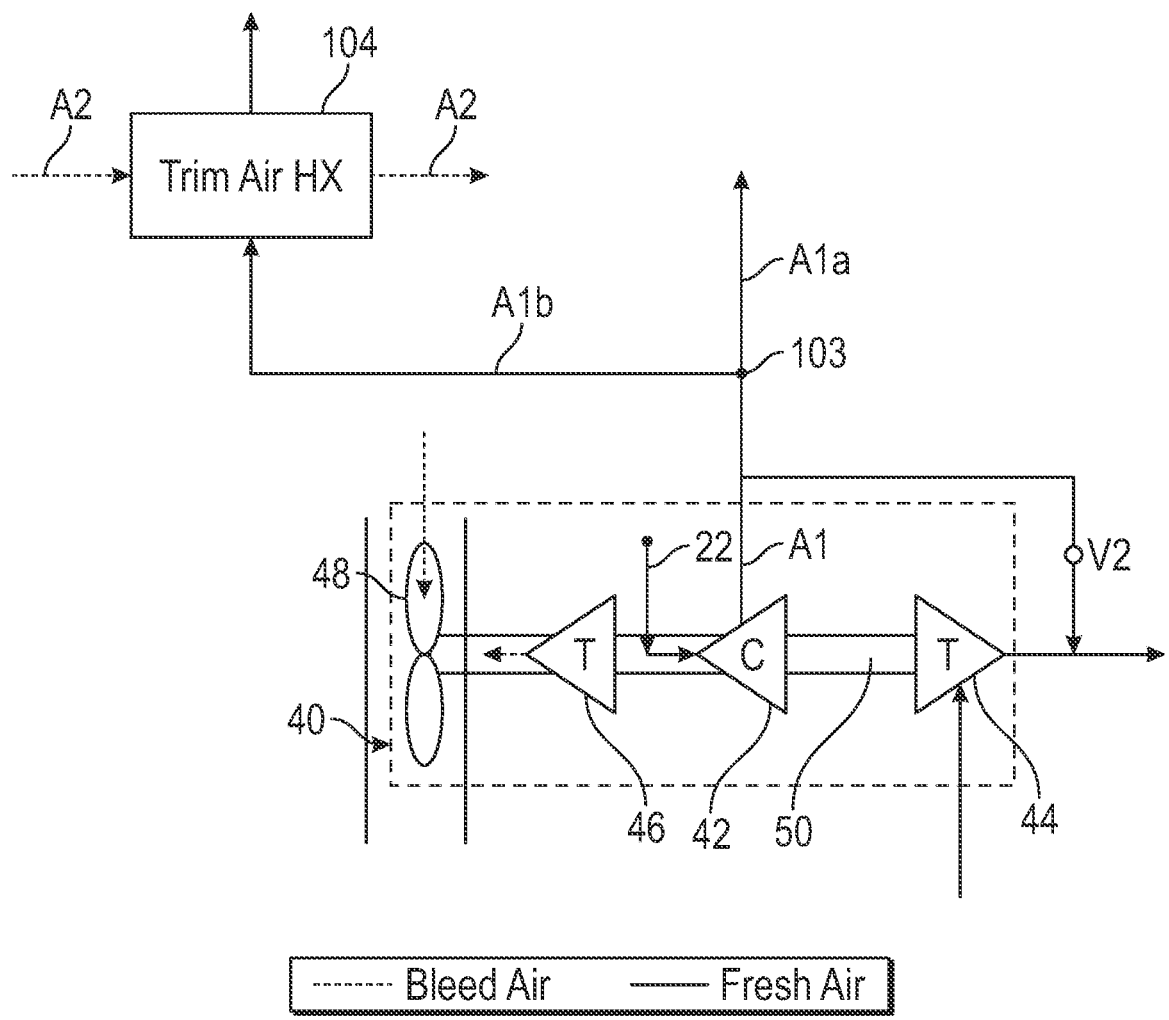
FIG. 3 is a detailed schematic diagram of a portion of a pack of an environmental control system according to an embodiment.

Because the temperature of the mixture A1+A3 output from the one or more outlets of the mixing manifold 102 is based on the hottest zone of the plurality of zones, the temperature of the mixture A1+A3 may be too cool to meet the demands of one or more of the other zones. Accordingly, one or more flows of the mixture A1+A3 may be heated by adding a flow of trim medium thereto. The trim medium may be fresh air or outside air A1, such as taken from a portion of an ECS pack 20. For example, the trim medium may be a partially conditioned flow of first medium A1 from the ECS pack 20. In an embodiment, best shown in FIG. 3, a first portion A1a of the first medium A1, also referred to herein as a first flow A1a of the first medium A1, output from the compressor 42 is configured to flow through the other components of the ECS pack 20 in a manner as previously described and a second portion A1b of the first medium A1, also referred to herein as the second flow A1b of the first medium A1, output from the compressor 42 is diverted via a trim outlet 103 for use as the trim medium.

The second portion A1b of the first medium A1 is heated before being mixed with the one or more flows of the mixture A1+A3 output from the mixing manifold 102. In the illustrated, non-limiting embodiment, the second portion A1b of the first medium A1 is heated within a trim heat exchanger 104. Although the trim heat exchanger 104 is illustrated as being located separately from the ECS pack 20, embodiments where the trim heat exchanger 104 is integrated into the ECS pack 20 are also contemplated herein. A flow of the second medium A2 may be arranged in a heat transfer relationship with the second portion A1b of the first medium A1 within the trim heat exchanger 104. In the illustrated, non-limiting embodiment, the trim heat exchanger 104 is arranged upstream from the ECS pack 20 relative to the flow of the second medium A2. Accordingly, the second medium A2 drawn or bled from an engine or auxiliary power unit is cooled within the trim heat exchanger 104 before being provided to the inlet 22 of the ECS pack 20 and used to drive the compressor 42 via the turbine 44 as previously described.

The flow of heated second portion A1b of the first medium A1 (trim medium) is then selectively mixed with one or more of the flows output from the mixing manifold 102 for delivery to one or more corresponding loads, such as zones 24a-24d of the aircraft, respectively. The amount of the trim medium A1b mixed with each flow output from the mixing manifold may be controlled via at least one valve 108. By controlling the amount of trim medium A1b mixed with each flow, different temperatures of conditioned medium that does not include any bleed air may be delivered to each of the plurality of zones 24a-24d.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system comprising:
   at least one environmental control system pack having at least one inlet, a trim outlet and a primary outlet, wherein a trim medium is output from the trim outlet and a first medium is output from the primary outlet;
   a mixing manifold having an inlet and at least one outlet, the inlet of the mixing manifold being fluidly connected to the primary outlet of the at least one environmental control system pack;
   a trim heat exchanger fluidly connected to the trim outlet and the at least one inlet of the at least one environmental control system pack, wherein within the trim heat exchanger the trim medium is arranged in a heat exchange relationship with a second medium, the second medium output from the trim heat exchanger being provided to the at least one inlet of the at least one environmental control system pack and the trim medium output from the trim heat exchanger being mixed with a flow output from the at least one outlet of the mixing manifold.

2. The environmental control system of claim 1, wherein the first medium is outside air and the second medium is bleed air.

3. The environmental control system of claim 1, wherein the at least one environmental control system pack further comprises an air cycle machine having a compressor.

4. The environmental control system of claim 3, wherein the trim outlet is located downstream from the compressor relative to the first medium.

5. The environmental control system of claim 3, wherein the air cycle machine further comprises a turbine and energy is extracted from the second medium within the turbine.

6. The environmental control system of claim 5, wherein the at least one environmental control system pack further comprises a ram air circuit having at least one heat exchanger, the at least one heat exchanger being arranged downstream from the trim heat exchanger and upstream from the turbine relative to a flow of the second medium.

7. The environmental control system of claim 1, wherein the trim medium output from the trim heat exchanger mixed with the flow output from the at least one outlet of the mixing manifold is provided to a load.

8. The environmental control system of claim 7, further comprising at least one valve for controlling an amount of the trim medium that is mixed with the flow output from the at least one outlet of the mixing manifold.

9. The environmental control system of claim 7, wherein the second medium is not provided to the load.

10. The environmental control system of claim 1, wherein the at least one environmental control system pack includes a plurality of environmental control system packs, and the primary outlet of each of the plurality of environmental control system packs is fluidly connected to the mixing manifold.

11. The environmental control system of claim 1, wherein the mixing manifold is configured to receive a third medium.

12. The environmental control system of claim 1, wherein the environmental control system is part of an aircraft.

\* \* \* \* \*